United States Patent
Gao et al.

(10) Patent No.: US 12,420,321 B1
(45) Date of Patent: Sep. 23, 2025

(54) METHOD FOR DEGRADING HALOGENATED POLYCYCLIC AROMATIC HYDROCARBONS IN SOIL BY USING CRYPTOMELANE

(71) Applicant: Nanjing Agricultural University, Nanjing (CN)

(72) Inventors: Yanzheng Gao, Nanjing (CN); Pengfei Cheng, Nanjing (CN); Jian Wang, Nanjing (CN); Wanting Ling, Nanjing (CN)

( * ) Notice: Subject to any disclaimer, the term of this patent is extended or adjusted under 35 U.S.C. 154(b) by 0 days.

(21) Appl. No.: 18/907,488

(22) Filed: Oct. 5, 2024

(30) Foreign Application Priority Data

May 16, 2024 (CN) .......................... 202410606609.7

(51) Int. Cl.
*B09C 1/08* (2006.01)

(52) U.S. Cl.
CPC ...................... *B09C 1/08* (2013.01)

(58) Field of Classification Search
None
See application file for complete search history.

(56) References Cited

U.S. PATENT DOCUMENTS

| 5,824,541 A | 10/1998 | Horn et al. |
| 6,383,128 B1 * | 5/2002 | Pierzynski ............... B09C 1/08 588/256 |
| 2011/0091283 A1 * | 4/2011 | Suib ................... C01G 45/1221 405/128.75 |

FOREIGN PATENT DOCUMENTS

| CN | 103084153 A | 5/2013 |
| CN | 106903154 A | 6/2017 |
| CN | 110079322 A | 8/2019 |
| CN | 110508613 B | 7/2021 |
| CN | 112964795 B | 4/2022 |
| CN | 117259419 A | 12/2023 |
| CN | 117586778 A * | 2/2024 ............ C09K 17/08 |

OTHER PUBLICATIONS

Derwent Abstract of CN 117586778 A; "Preparing Composite Material Useful for Reducing/Degradation of Polycyclic Aromatic Hydrocarbons in Soil," Chen et al.; Feb. 23, 2024 (Year: 2024).*
Search Report, prepared by Beijing Zhanqiao Intellectual Property Agency, dated Aug. 21, 2024.
Notice of Grant of Patent Right for Invention, issued in CN202410606609.7 (priority application), by CNIPA, dated Aug. 19, 2024.

* cited by examiner

*Primary Examiner* — John J Figueroa

(57) ABSTRACT

A method for degrading halogenated polycyclic aromatic hydrocarbons in soil by using cryptomelane, relating to the technical field of soil regeneration, includes the following steps: S1: preparing cryptomelane; and S2: degrading halogenated polycyclic aromatic hydrocarbons in soil, where S2 includes S2-1: taking a soil sample, and grinding and removing impurities; S2-2: adding solid cryptomelane prepared in Step S1 in the soil sample, uniformly mixing to obtain a mixture, and transferring the mixture to a shaker for oscillation, thus obtaining a soil sample containing cryptomelane; S2-3: transferring the soil sample containing cryptomelane into a brown glass bottle, adding a halogenated polycyclic aromatic hydrocarbon methanol solution into the soil sample for continuous oscillation, and then degrading the soil sample containing cryptomelane at a room temperature.

9 Claims, 8 Drawing Sheets

METHOD FOR DEGRADING HALOGENATED POLYCYCLIC AROMATIC HYDROCARBONS IN SOIL BY USING CRYPTOMELANE

REFERENCE TO RELATED APPLICATIONS

The present application claims the priority of Chinese patent application No. 202410606609.7, filed on 2024 May 16, the entire disclose of which is incorporated herein by reference.

TECHNICAL FIELD

The present disclosure relates to the technical field of soil regeneration, in particular to a method for degrading halogenated polycyclic aromatic hydrocarbons in soil by using cryptomelane.

BACKGROUND

Halogenated polycyclic aromatic hydrocarbons (HPAHs), including chlorinated polycyclic aromatic hydrocarbons (ClPAHs) and brominated polycyclic aromatic hydrocarbons (BrPAHs), are a new pollutant. HPAHs can be formed directly during the combustion of fossil fuels, or by photochemical or thermal reaction between PAHs and chlorine or bromine sources. At present, HPAHs has been detected in industrial, agricultural, and other soils, with the concentration ranging from 0.11 to 2880 μg kg-1. HPAHs are similar to polychlorinated/polybroninated dibenzo-p-dioxins in structure, which show stronger aromatic hydrocarbon receptor activity than parent thereof, and have stronger immunotoxicity, genotoxicity and developmental toxicity. Therefore, there is an urgent need to study the degradation of HPAHs, and the research and development of technology of HPAHs degradation in soil can reduce the exposure risk of HPAHs.

Chemical degradation technology is widely used due to its in-situ remediation performance and simple and easy operation of the equipment. Advanced oxidation process is a widely used organic pollutant degradation technology at present, and high-activity free radicals such as hydroxyl, sulfate and superoxide anions can be produced during implementation. However, it was found in the actual remediation process of organic pollutants that the content of soil organic carbon decreased significantly, which would lead to the loss of soil fertility at the same time. Cryptomelane, which is an octahedral-2 molecular sieve with a 2×2 pore structure, has the characteristics of large surface area, strong oxidation activity, high cation exchange capacity, rich pore structure, etc. Cryptomelane, which can oxidize inorganic ions such as As (III), Se (III) and Cr (III) through reactions such as electron transfer and free radical catalysis, and also have strong oxidative degradation ability for organic pollutants such as formaldehyde and bisphenol A, has attracted extensive attention in the field of catalytic degradation. Cryptomelane is an economic, green, and environment-friendly functional material which is common in a natural environment. It may be an effective means to achieve HPAHs degradation in soil by developing high-activity cryptomelane and apply the same to HPAHs contaminated soil.

SUMMARY

In order to solve the problem above, the present disclosure provides a method for degrading halogenated polycyclic aromatic hydrocarbons in soil by using cryptomelane.

The technical solution of the present disclosure is as follows: A method for degrading halogenated polycyclic aromatic hydrocarbons in soil by using cryptomelane includes the following steps:

S1: preparing cryptomelane

S1-1: dissolving 0.01 mol of $MnCl_2$ and 0.015-0.02 mol of $KMnO_4$ in 95-105 mL of water, stirring at a rate of 140-160 rpm until the $MnCl_2$ and $KMnO_4$ are completely dissolved, after the $MnCl_2$ and $KMnO_4$ are completely dissolved, transferring the water to a high-pressure reaction kettle, putting the high-pressure reaction kettle in a blast oven to react at 155-165° C. for 22-26 hours, thus obtaining a reaction product;

S1-2: centrifuging the reaction product at 7500-8500 rpm for 8-12 min, and adding ultrapure water after pouring out a supernatant;

S1-3: repeating an operation of Step S1-2 for 8-10 times, and drying a bottom solid to obtain a dried solid;

S1-4: adding the dried solid into a $Cu(NO_3)_2$ aqueous solution with a concentration of 0.01-0.1 mol/L, oscillating in a shaker at 180-220 rpm for 10-14 hours to obtain a suspension;

S1-5: centrifuging the suspension at a rotating speed of 7500-8500 rpm for 8-12 min, and adding ultrapure water after pouring out a supernatant;

S1-6: repeating an operation of Step S1-5 for 8-10 times, and drying and grinding to obtain solid cryptomelane;

S2: degrading halogenated polycyclic aromatic hydrocarbons in soil

S2-1: taking a soil sample, and grinding and removing impurities;

S2-2: adding the solid cryptomelane prepared in Step S1, which accounts for 2.5-7.5% of the mass of the soil sample, into the soil sample, uniformly mixing to obtain a mixture, and then transferring the mixture to the shaker with a rotating speed of 190-210 rpm to oscillate for 1-2 hours, thus preparing a soil sample containing cryptomelane; and S2-3: finally transferring the soil sample containing cryptomelane into a brown glass bottle, adding a halogenated polycyclic aromatic hydrocarbon methanol solution according to situation that a ratio of the soil sample containing cryptomelane to the halogenated polycyclic aromatic hydrocarbon methanol solution is 9-11 mg/ml, oscillating at a rotating speed of 190-210 rpm for 1-1.5 hours, then pouring the soil sample containing cryptomelane into a glass culture dish, and degrading halogenated polycyclic aromatic hydrocarbons at a room temperature.

Further, in Step S1-3 and Step S1-6, a drying method includes the following steps: drying the bottom solid in a blast oven at 65-75° C. for 11-13 hours, washing with absolute ethyl alcohol for 1-2 times, and continuing to dry at a vacuum condition of $0.9 \times 10^{-2}$-$1.1 \times 10^{-2}$ mmHg for 2-3 hours.

It should be noted that the solid prepared by washing with ultrapure water and ethanol and drying $MnCl_2$ and $KMnO_4$ in vacuum can improve product quality, and reduce impurities and water residue, and is more energy-saving and environment-friendly.

Further, in Step S1-2 and Step S1-5, the volume of the added ultrapure water is the same as that of the supernatant liquid that is poured out.

It should be noted that the adding of ultrapure water with the same volume as the supernatant can reduce a concentration gradient between a product and a solvent, which is conducive to dispersing the product more evenly and reducing an agglomeration phenomenon, such that a more uniform product distribution can be obtained, and the degradation performance of cryptomelane is further improved.

Further, in Step S1-6, a grinding treatment method includes the following steps: firstly, putting the dried solid cryptomelane into an agate mortar for grinding and crushing, then sieving with a 50-70 mesh sieve, removing impurities, and continuously grinding and sieving with a 90-110 mesh sieve.

It should be noted that by grinding the solid cryptomelane to the above particle size, the surface area of the solid cryptomelane can be increased, more active sites can be provided, and the solid cryptomelane is easier to make contact and react with the halogenated polycyclic aromatic hydrocarbons, thus improving the yield of superoxide radicals in the cryptomelane, enhancing the adsorption capacity of the cryptomelane to the halogenated polycyclic aromatic hydrocarbons in the soil, and further promoting the degradation process of the halogenated polycyclic aromatic hydrocarbons in the soil.

Further, in Step S2-1, a grinding and impurity-removal treatment method includes the following steps: firstly, carrying out physical impurity removal on the soil sample, then carrying out coarse grinding to obtain a soil sample with a particle size of 30-40 meshes, then carrying out secondary impurity removal, continuously and finely grinding the soil sample with a particle size of 30-40 meshes, and finally obtaining a soil sample with a particle size of 55-65 meshes.

It should be noted that the specific surface area of finely ground soil particles increases, which means that more microorganisms can be attached to the surfaces of these particles, which increases the contact opportunities between the microorganisms and the halogenated polycyclic aromatic hydrocarbons in the soil, thus improving the degradation efficiency.

Furthermore, after step S1, the solid cryptomelane is subjected to composite treatment, and the composite treatment method includes the following steps:

(1) atomizing, by ultrasonic spraying, active components to generate droplets A, and atomizing a regulatory component to generate droplets B;
where the active components, in terms of mass percentage, include 40-60% of plant ash, 15-25% of vitamin $B_{12}$, 5-7% of sodium silicate and the balance of water, and the regulatory component is a pH regulator; and (2) under the drive of a nitrogen gas flow of 500-700 SCCM, spraying the droplets A on the surface of the solid cryptomelane through a bubble refiner, stopping ultrasonic spraying after introducing 0.1-2.0 L of atomized droplets A into every 30-50 g of solid cryptomelane, and freeze-drying at −60° C. to −40° C. for 20-30 min to generate pores; under the drive of the nitrogen gas flow of 200-300 SCCM, spraying the droplets B into the pores on the surface of the solid cryptomelane through the bubble refiner, and stopping ultrasonic spraying after introducing 0.1-2.0 L of atomized droplets B into every 80-100 g of solid cryptomelane, and drying in vacuum for 1.5-2 hours at a room temperature to obtain a solid cryptomelane after composite treatment.

It should be noted that the plant ash is mainly composed of potassium carbonate and calcium carbonate, and is rich in potassium fertilizer and calcium fertilizer. Vitamin $B_{12}$ ($VB_{12}$) is a biological coenzyme, the mechanism of action of the biological coenzyme in the process of catalytic reduction dehalogenation is mainly reflected in its high catalytic activity for halogenated organic compounds (HOCs). The $VB_{12}$ can effectively catalyze the reductive dehalogenation of HOCs. By adopting the above components, the active components can effectively reduce the influence on organic carbon in the soil, and reduce the ecological risk of soil caused by the microbial activity reduction caused by the degradation of halogenated polycyclic aromatic hydrocarbons in the soil. A hydrophobic film can increase the adsorption capacity of the cryptomelane to the halogenated polycyclic aromatic hydrocarbons, this is because the halogenated polycyclic aromatic hydrocarbons are usually hydrophobic compounds which can be more easily adsorbed on a hydrophobic surface. Moreover, under the action of the hydrophobic film, the droplets B are easier to enter and stay in the pores, thus realizing the filling function of the pH regulator in the pores. The freeze-drying process can remove water from the surface of the cryptomelane and make the cryptomelane form a porous structure, thus providing loading points for the pH regulator. This is conducive to improving the adsorption capacity of the halogenated polycyclic aromatic hydrocarbons, and promoting the degradation reaction.

Further, in Step (1), the pH regulator is composed of lime water with a mass concentration of 2-3% and calcined gypsum in equal volume ratio.

It should be noted that the lime water can be used to neutralize acidic substances in the soil, thus improving a pH value of the soil; and the calcined gypsum can be used to provide calcium and sulfur in the soil. The above alkaline regulator not only can provide organic matters and nutrient elements needed for the growth of plants, but also can improve the soil environment and promote the healthy growth of plants. Meanwhile, the alkaline regulator also has the advantages of environmental protection and sustainability, and can also improve the structure and ventilation of the soil.

Further, porosity of the pores is 30-50%.

It should be note that the porosity above can provide active sites for the pH regulator, thus promoting the further improvement effect of the pH regulator on the acidity of the soil.

Further, the halogenated polycyclic aromatic hydrocarbons are 9-chlorofluorene, 9-bromfluorene, 9-chlorophenanthrene, 9-bromphenanthrene, 1-chloropyrene, and 1-brompyrene.

It should be noted that the degradation rate of halogenated fluorene by the solid cryptomelane prepared according to the present disclosure can reach 100%, the residual rates of halogenated pyrene and halogenated phenanthrene in the soil are also reduced to 18.9-60.4% after the application of the cryptomelane, and the degradation effect is good.

Compared with the prior art, the present disclosure has beneficial effects as follows:

(1). According to the present disclosure, by optimizing a molar ratio of $KMnO_4$ to $MnCl_2$ and the concentration of an ion exchange solution $Cu(NO_3)_2$ in the synthesis process and adopting a hydrothermal method and an ion exchange method, the cryptomelane with high degradation efficiency for SPAHs in the soil is prepared, the degradation rate of the cryptomelane on the halogenated fluorene can reach 100%, and the residual rates of halogenated pyrene and halogenated phenanthrene in the soil are also reduced to 18.9-60.4% after the application of the cryptomelane. The product is safe, effective, environment-friendly, and low in treatment cost.

(2). The cryptomelane prepared according to the present disclosure has good degradation efficiency on 9-chlorofluorene, 9-bromofluorene, 9-chlorophenanthrene, 9-bromophenanthrene, 1-chloropyrene and 1-bromopyrene in the soil, has broad degradation spectrum and high efficiency, and thus is suitable for soils with different pH values.

(3). According to the present disclosure, the adsorption capacity of the cryptomelane to halogenated polycyclic aromatic hydrocarbons can be further increased by carrying out composite treatment on solid cryptomelane, and the adsorption capacity of the cryptomelane to the halogenated polycyclic aromatic hydrocarbons is increased by transforming active components into hydrophobic films in the composite treatment process, such that the halogenated polycyclic aromatic hydrocarbons can be more easily adsorbed on the hydrophobic surfaces. Moreover, under the action of the hydrophobic film, the droplets B are easier to enter and stay in the pores, thus realizing the filling function of the pH regulator in the pores, and effectively avoiding the influence of pH change on the soil environment.

DETAILED DESCRIPTION OF THE EMBODIMENTS

Figure 1:
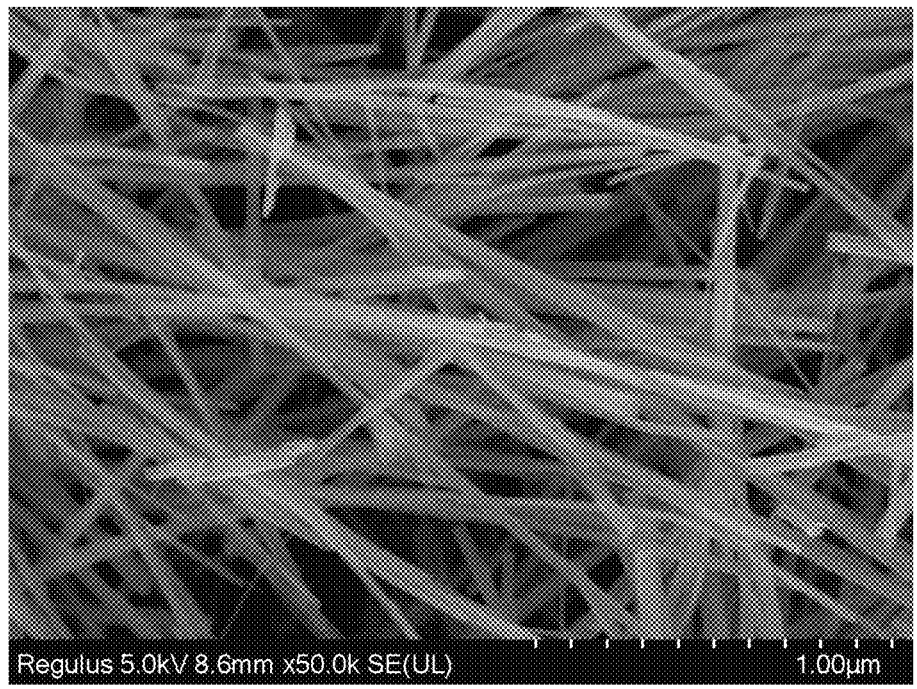
FIG. 1 is a scanning electron microscopy diagram of cryptomelane synthesized according to Embodiment 3 of the present disclosure.

In order to further set forth the ways and effects of the present disclosure, the technical solution of the present disclosure will be described below clearly and completely in conjunction with experiments.

In the embodiment of the present disclosure, HPAHs is the abbreviation of halogenated polycyclic aromatic hydrocarbons, ClPAHs is the abbreviation of chlorinated polycyclic aromatic hydrocarbons, and BrPAHs is the abbreviation of brominated polycyclic aromatic hydrocarbons.

Embodiment: 1: A method for degrading halogenated polycyclic aromatic hydrocarbons in soil by using cryptomelane includes the following steps:

S1. Cryptomelane preparation

S1-1. 0.01 mol of $MnCl_2$ and 0.018 mol of $KMnO_4$ are dissolved in 100 mL of water, and stirred at a rate of 150 rpm until the two are completely dissolved. After the $MnCl_2$ and $KMnO_4$ are completely dissolved in the water, the water is transferred to a high-pressure reaction kettle, the high-pressure reaction kettle is put in a blast oven to react at 160° C. for 24 hours, thus obtaining a reaction product.

S1-2. The reaction product is centrifuged at 8000 rpm for 10 min, and ultrapure water is added after a supernatant is poured out, where the volume of the added ultrapure water is the same as that of the supernatant that is poured out.

S1-3. An operation of Step S1-2 is repeated for 9 times, and a bottom solid is dried to obtain a dried solid. A drying method includes the following steps: drying the bottom solid in a blast oven at 70° C. for 12 hours, washing with absolute ethyl alcohol for once, and continuing to dry at a vacuum condition of $10^{-2}$ mmHg for 2.5 hours.

S1-4. The dried solid is added into a $Cu(NO_3)_2$ aqueous solution with a concentration of 0.05 mol/L, oscillated in a shaker at 200 rpm for 12 hours to obtain a suspension.

S1-5. The suspension is centrifuged at a rotating speed of 8000 rpm for 10 min, and ultrapure water is added after a supernatant is poured out, where the volume of the added ultrapure water is the same as that of the supernatant that is poured out.

S1-6. An operation of Step S1-5 for 9 times, and then drying and grinding are carried out to obtain solid cryptomelane. The drying method includes the following steps: drying the solid cryptomelane at the bottom in the blast oven at 70° C. for 12 hours, washing with absolute ethyl alcohol for once, and continuing to dry at a vacuum condition of $10^{-2}$ mmHg for 2.5 hours.

The grinding treatment method includes the following steps: firstly, putting the dried solid cryptomelane into an agate mortar for grinding and crushing, then sieving with a 60-mesh sieve, removing impurities, and continuously grinding and sieving with a 100-mesh sieve.

After step S1, the solid cryptomelane is subjected to composite treatment, and the composite treatment method includes the following steps:

(1) Active components are atomized by ultrasonic spraying to generate droplets A, and a regulatory component is atomized by ultrasonic spraying to generate droplets B;

where the active components, in terms of mass percentage, include 50% of plant ash, 20% of vitamin $B_{12}$, 6% of sodium silicate and the balance of water, and the regulatory component is a pH regulator. In Step (1), the pH regulator is composed of lime water with a mass concentration of 2.5% and calcined gypsum in equal volume ratio.

(2) Under the drive of a nitrogen gas flow of 600 SCCM, the droplets A are sprayed on the surface of the solid cryptomelane through a bubble refiner, the ultrasonic spraying is stopped after introducing 1.0 L of atomized droplets A into every 40 g of solid cryptomelane, and freeze-drying is carried out at −50° C. for 25 min to generate pores. Under the drive of the nitrogen gas flow of 250 SCCM, the droplets B are sprayed into the pores on the surface of the solid cryptomelane through the bubble refiner, and ultrasonic spraying is stopped after introducing 1.0 L of atomized droplets B into every 90 g of solid cryptomelane, and drying in vacuum is carried out for 1.7 hours at a room temperature to obtain solid cryptomelane after composite treatment.

S2. Degradation of halogenated polycyclic aromatic hydrocarbons in soil

S2-1. A soil sample is taken, ground, and subjected to impurity removal. A grinding and impurity-removal treatment method includes the following steps: firstly, carrying out physical impurity removal on the soil sample, then carrying out coarse grinding to obtain a soil sample with a particle size of 35 meshes, then carrying out secondary impurity removal, continuously and finely grinding the soil sample with a particle size of 35 meshes, and finally obtaining a soil sample with a particle size of 60 meshes.

S2-2. The solid cryptomelane prepared in Step S1, which accounts for 5% of the mass of the soil sample, is added into the soil sample, and uniformly mixed to obtain a mixture. Then, the mixture is transferred to the shaker with a rotating speed of 200 rpm to oscillate for 1.5 hours, thus preparing a soil sample containing cryptomelane.

S2-3. Finally, the soil sample containing cryptomelane is transferred into a brown glass bottle, a halogenated polycyclic aromatic hydrocarbon methanol solution is added according to situation that a ratio of the soil sample containing cryptomelane to the halogenated polycyclic aromatic hydrocarbon methanol solution is 10 mg/mL. After oscillating at a rotating speed of 200 rpm for 1.3 hours, the soil sample containing cryptomelane is poured into a 6 cm glass culture dish, and halogenated polycyclic aromatic hydrocarbons are degraded at a room temperature.

The halogenated polycyclic aromatic hydrocarbons are 9-chlorofluorene, 9-bromfluorene, 9-chlorophenanthrene, 9-bromphenanthrene, 1-chloropyrene, and 1-brompyrene.

Embodiment 2: the difference from Embodiment 1 is that in Step S1-1, 0.01 mol of $MnCl_2$ and 0.015 mol of $KMnO_4$ are dissolved in 95 mL of water, and obtained cryptomelane is recorded as cryptomelane 2.

Embodiment 3: the difference from Embodiment 1 is that in Step S1-1, 0.01 mol of $MnCl_2$ and 0.02 mol of $KMnO_4$ are dissolved in 105 mL of water, and obtained cryptomelane is recorded as cryptomelane 1.

Embodiment 4: the difference from Embodiment 1 is that in Step S1, in S1-1, $MnCl_2$ and $KMnO_4$ are stirred at a rate of 140 rpm until the two are completely dissolved. After the $MnCl_2$ and $KMnO_4$ are completely dissolved in the water, the water is transferred to the high-pressure reaction kettle, the high-pressure reaction kettle is then put in a blast oven to react at 150° C. for 26 hours, thus obtaining a reaction product;

in S1-2, the reaction product is centrifuged at 7500 rpm for 12 min, and ultrapure water is added after a supernatant is poured out, where the volume of the added ultrapure water is the same as that of the supernatant that is poured out;

in S1-3, an operation of Step S1-2 is repeated for 8 times, and a solid at the bottom is dried to obtain a dried solid;

in S1-4, the oscillation is carried out in a shaker at 180 rpm for 14 hours to obtain a suspension;

in S1-5, the suspension is centrifuged at a rotating speed of 7500 rpm for 12 min, and ultrapure water is added after a supernatant is poured out, where the volume of the added ultrapure water is the same as that of the supernatant that is poured out; and in S1-6, an operation of Step S1-5 for 8 times, and then drying and grinding are carried out to obtain solid cryptomelane.

Embodiment 5: the difference from Embodiment 1 is that in Step S1, in S1-1, $MnCl_2$ and $KMnO_4$ are stirred at a rate of 160 rpm until the two are completely dissolved. After the $MnCl_2$ and $KMnO_4$ are completely dissolved in the water, the water is transferred to the high-pressure reaction kettle, the high-pressure reaction kettle is then put in a blast oven to react at 165° C. for 22 hours, thus obtaining a reaction product;

in S1-2, the reaction product is centrifuged at 8500 rpm for 8 min, and ultrapure water is added after a supernatant is poured out, where the volume of the added ultrapure water is the same as that of the supernatant that is poured out;

in S1-3, an operation of Step S1-2 is repeated for 10 times, and a solid at the bottom is dried to obtain a dried solid;

in S1-4, the oscillation is carried out in a shaker at 220 r/min for 10 hours to obtain a suspension;

in S1-5, the suspension is centrifuged at a rotating speed of 8500 rpm for 8 min, and ultrapure water is added after a supernatant is poured out, where the volume of the added ultrapure water is the same as that of the supernatant that is poured out; and in S1-6, an operation of Step S1-5 for 10 times, and then drying and grinding are carried out to obtain solid cryptomelane.

Embodiment 6: the difference from Embodiment 1 is that in Step S1-4, the dried solid is then added into a $Cu(NO_3)_2$ aqueous solution with a concentration of 0.01 mol/L, and obtained cryptomelane is recorded as cryptomelane 3.

Embodiment 7: the difference from Embodiment 1 is that in Step S1-4, the dried solid is then added into a $Cu(NO_3)_2$ aqueous solution with a concentration of 0.1 mol/L, and obtained cryptomelane is recorded as cryptomelane 4.

Embodiment 8: the difference from Embodiment 1 is that in Step S1-3 and step S1-6, the drying method is as follows: drying the bottom solid in a blast oven at 65° C. for 13 hours, washing with absolute ethanol once, and finally continuing to dry for 2 hours in a vacuum condition of $0.9\times10^{-2}$ mmHg.

Embodiment 9: the difference from Embodiment 1 is that in Step S1-3 and step S1-6, the drying method is as follows: drying the bottom solid in a blast oven at 75° C. for 11 hours, washing with absolute ethanol twice, and finally continuing to dry for 3 hours in a vacuum condition of $1.1\times10^{-2}$ mmHg.

Embodiment 10: the difference from Embodiment 1 is that in Step S1, in the composite treatment method, the active components, by mass percentage, include 40% of plant ash, 15% of vitamin $B_{12}$, 5% of sodium silicate, and the balance of water.

Embodiment 11: the difference from Embodiment 1 is that in Step S1, in the composite treatment method, the active components, by mass percentage, include 60% of plant ash, 25% of vitamin $B_{12}$, 7% of sodium silicate, and the balance of water.

Embodiment 12: the difference from Embodiment 1 is that in Step S1, in the composite treatment method, under the drive of a nitrogen gas flow of 500 SCCM, the droplets A are sprayed on the surface of the solid cryptomelane through a bubble refiner, the ultrasonic spraying is stopped after introducing 0.1 L of atomized droplets A into every 30 g of solid cryptomelane, and freeze-drying is carried out at −60° C. for 20 min to generate pores. Under the drive of the nitrogen gas flow of 200 SCCM, the droplets B are sprayed into the pores on the surface of the solid cryptomelane through the bubble refiner, and ultrasonic spraying is stopped after introducing 0.1 L of atomized droplets B into every 80 g of solid cryptomelane, and drying in vacuum is carried out for 1.5 hours at a room temperature to obtain solid cryptomelane after composite treatment.

Embodiment 13: the difference from Embodiment 1 is that in Step S1, in the composite treatment method, under the drive of a nitrogen gas flow of 700 SCCM, the droplets A are sprayed on the surface of the solid cryptomelane through a bubble refiner, the ultrasonic spraying is stopped after introducing 2.0 L of atomized droplets A into every 50 g of solid cryptomelane, and freeze-drying is carried out at −40° C. for 30 min to generate pores. Under the drive of the nitrogen gas flow of 300 SCCM, the droplets B are sprayed into the pores on the surface of the solid cryptomelane through the bubble refiner, and ultrasonic spraying is stopped after introducing 2.0 L of atomized droplets B into every 100 g of solid cryptomelane, and drying in vacuum is carried out for 2 hours at a room temperature to obtain solid cryptomelane after composite treatment.

Embodiment 14: the difference from Embodiment 1 is that in Step S2-2, the solid cryptomelane prepared in step S1, which accounts for 2.5% of the mass of the soil sample, is added into the soil sample, and then uniformly mixed to obtain a mixture.

Embodiment 15: the difference from Embodiment 1 is that in Step S2-2, the solid cryptomelane prepared in step S1, which accounts for 7.5% of the mass of the soil sample, is added into the soil sample, and then uniformly mixed to obtain a mixture.

Embodiment 16: the difference from Embodiment 1 is that in Step S2-2, the mixture is transferred to a shaker with a rotating speed of 190 rpm to oscillate for 2 hours, thus preparing a soil sample containing cryptomelane.

The soil sample containing cryptomelane is finally transferred into a brown glass bottle, a halogenated polycyclic aromatic hydrocarbon methanol solution is added according to situation that a ratio of the soil sample containing cryptomelane to the halogenated polycyclic aromatic hydrocarbon methanol solution is 9 mg/ml, oscillation is carried out at a rotating speed of 190 rpm for 1.5 hours, then the soil sample containing cryptomelane is poured into a glass culture dish, and the halogenated polycyclic aromatic hydrocarbons are degraded at a room temperature.

Embodiment 17: the difference from Embodiment 1 is that in Step S2-2, the mixture is transferred to a shaker with a rotating speed of 210 rpm to oscillate for 1 hour, thus preparing a soil sample containing cryptomelane.

The soil sample containing cryptomelane is finally transferred into a brown glass bottle, a halogenated polycyclic aromatic hydrocarbon methanol solution is added according to situation that a ratio of the soil sample containing cryptomelane to the halogenated polycyclic aromatic hydrocarbon methanol solution is 11 mg/ml, oscillation is carried out at a rotating speed of 210 rpm for 1 hour, then the soil sample containing cryptomelane is poured into a glass culture dish, and the halogenated polycyclic aromatic hydrocarbons are degraded at a room temperature.

Figure 2:
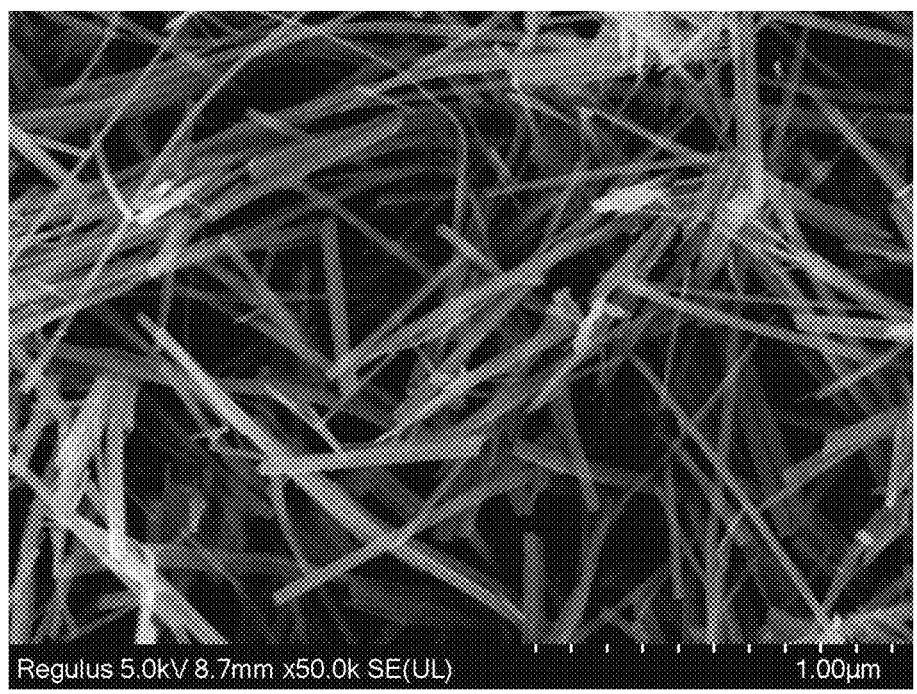
FIG. 2 is a scanning electron microscopy diagram of cryptomelane synthesized according to Embodiment 2 of the present disclosure.
Figure 3:
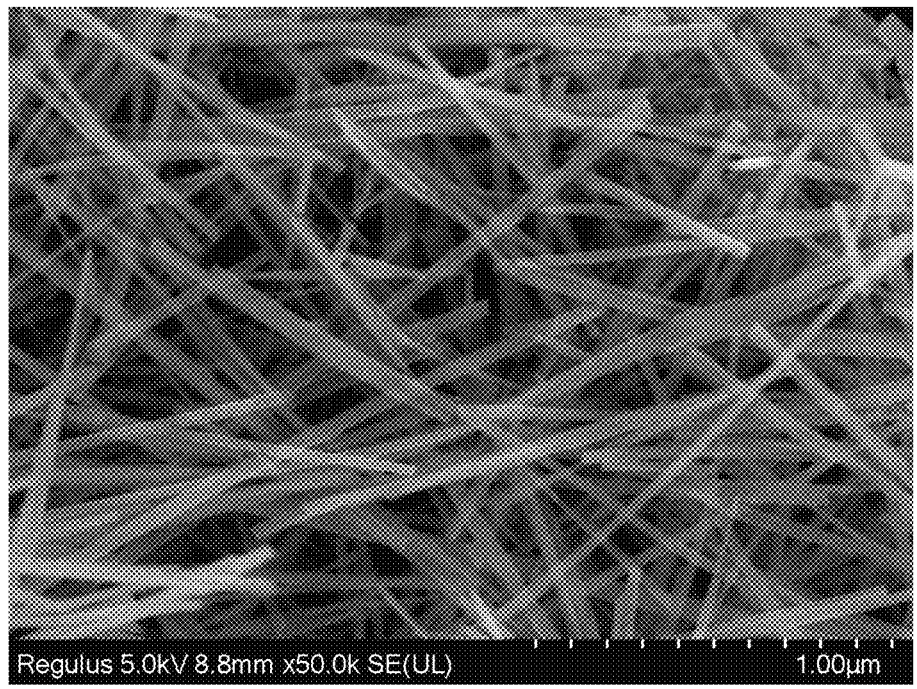
FIG. 3 is a scanning electron microscopy diagram of cryptomelane synthesized according to Embodiment 6 of the present disclosure.
Figure 4:
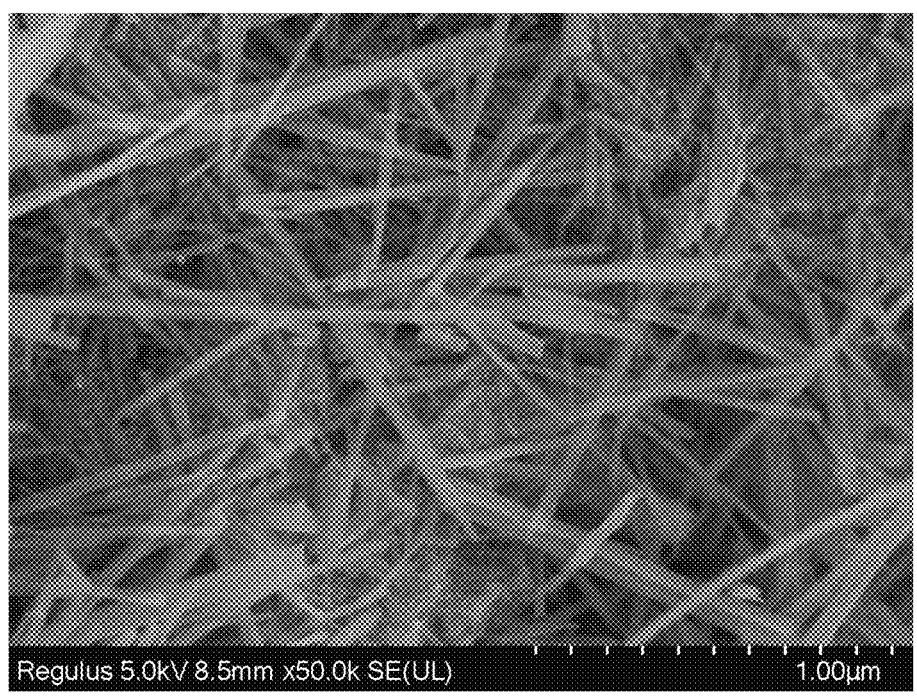
FIG. 4 is a scanning electron microscopy diagram of cryptomelane synthesized according to Embodiment 7 of the present disclosure.

Experimental example: Exploration 1: Exploration of the influence of a molar ratio of $MnCl_2$ to $KMnO_4$ and a molar concentration of $Cu(NO_3)_2$ on the properties of the cryptomelane The narrative basis of this exploration is the schemes in Embodiment 2, Embodiment 3, Embodiment 6, and Embodiment 7, aiming at clarifying the practical application effect of this part of the content in the present disclosure. In the present disclosure, a scanning electron microscope is used to characterize the morphologies of several types of cryptomelane, and scanning electron microscopy diagrams in FIG. 1-FIG. 4 show that the cryptomelane is of a rod-like structure, which conforms to tunnel structural characteristics of the cryptomelane, where FIG. 1 is the scanning electron microscopy diagram of cryptomelane 1; FIG. 2 is the scanning electron microscopy diagram of cryptomelane 21; FIG. 3 is the scanning electron microscopy diagram of cryptomelane 3; and FIG. 4 is the scanning electron microscopy diagram of cryptomelane 4. In addition, the scanning electron microscopy diagram shows that the rod-like structure of cryptomelane 2 is smaller than that of cryptomelane 1, and some nanorods appear. There are a lot of tiny nanorods in the scanning electron microscopy diagram of cryptomelane 4, but the rod-like structure of cryptomelane 3 has no obvious change compared with the cryptomelane 2. Therefore, the rod-like structure of the cryptomelane 2 synthesized by $MnCl_2$ and $KMnO_4$ in the molar ratio of 1:1.5 is relatively small, and the cryptomelane 2 present a nano structure after being treated with 0.1 mol $L^{-1}$ of $Cu(NO_3)_2$, and a large number of nanorods appear.

Figure 5:
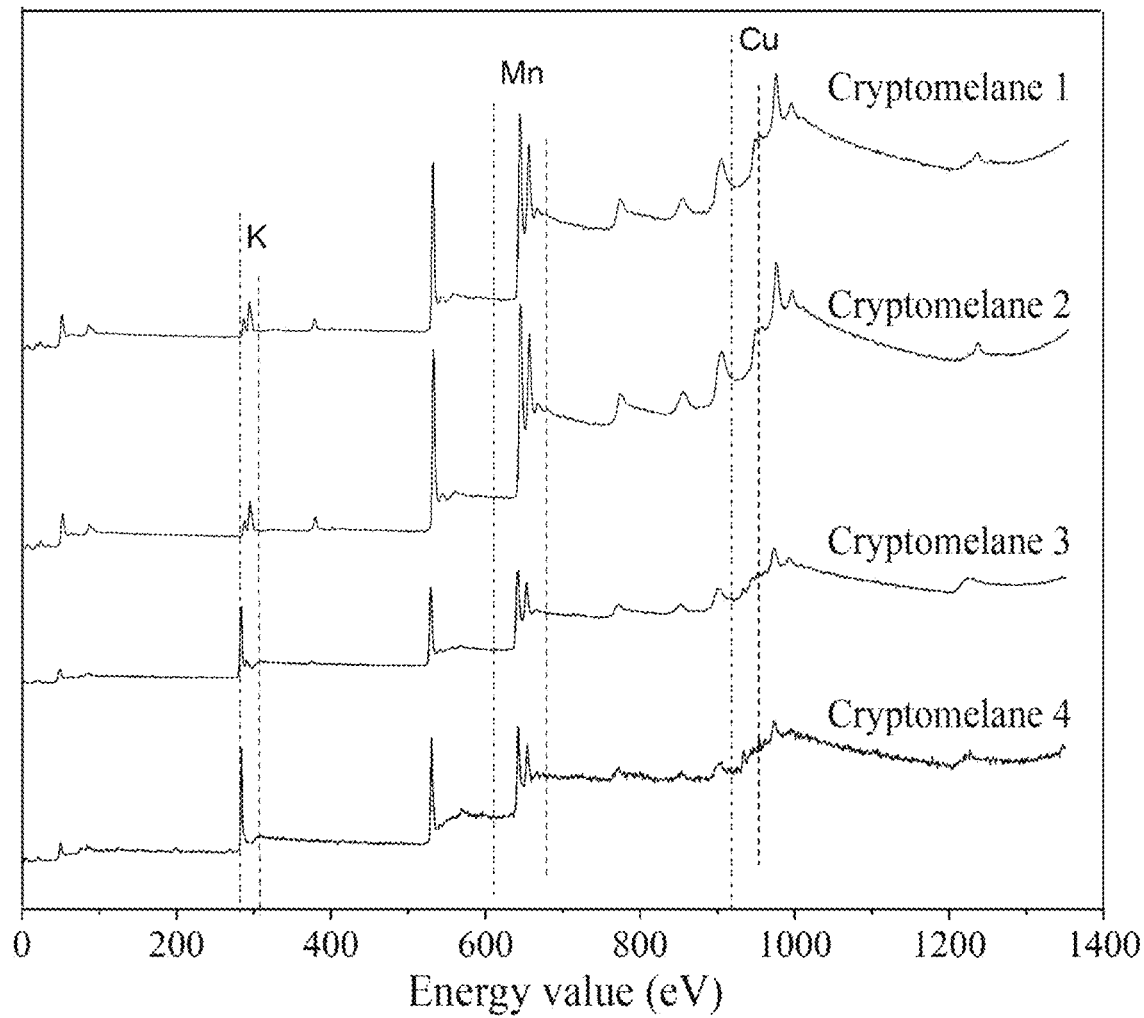
FIG. 5 is an X-ray photoelectron spectroscopy diagram of cryptomelane synthesized according to the present disclosure.

The contents of Mn, K and Cu in four types of cryptomelane are analyzed by an X-ray photoelectron spectrometer, as shown in FIG. 5. FIG. 5 shows that cryptomelane 1 and cryptomelane 2 contain Mn and K elements, while in cryptomelane 3 and cryptomelane 4, K element peaks are weakened, and Cu peaks appear. Table 1 shows that cryptomelane contains a high content of K element, which often exists in the tunnel structure of cryptomelane. Meanwhile, it is found that Cu element appears in the samples of cryptomelane 3 and cryptomelane 4, with the content of 3.8% and 20.9%, respectively, while the content of K element decreases. Therefore, when the cryptomelane 2 is added to the $Cu(NO_3)_2$ solution, the $K^+$ in the tunnel is replaced by $Cu^{2+}$ in the synthesis process, and the $Cu^{2+}$ entering the cryptomelane in 0.1 mol $L^{-1}$ $Cu(NO_3)_2$ solution is higher than that entering 0.01 mol $L^{-1}$ $Cu(NO_3)_2$ solution. Compared with $K^+$, $Cu^{2+}$, as a transition metal ion, can accept electrons in organic pollutants and promote the degradation thereof. Therefore, the cryptomelane 4 has a higher ability to accept electrons.

Table 1

| Content of metal elements in cryptomelane | | | |
| --- | --- | --- | --- |
| Cryptomelane | Mn | K | Cu |
| Cryptomelane 1 | 81.5% | 18.5% | 0% |
| Cryptomelane 2 | 76.4% | 24.6% | 0% |
| Cryptomelane 3 | 86.4% | 9.8% | 3.8% |
| Cryptomelane 4 | 72.4% | 6.7% | 20.9% |

Figure 6:
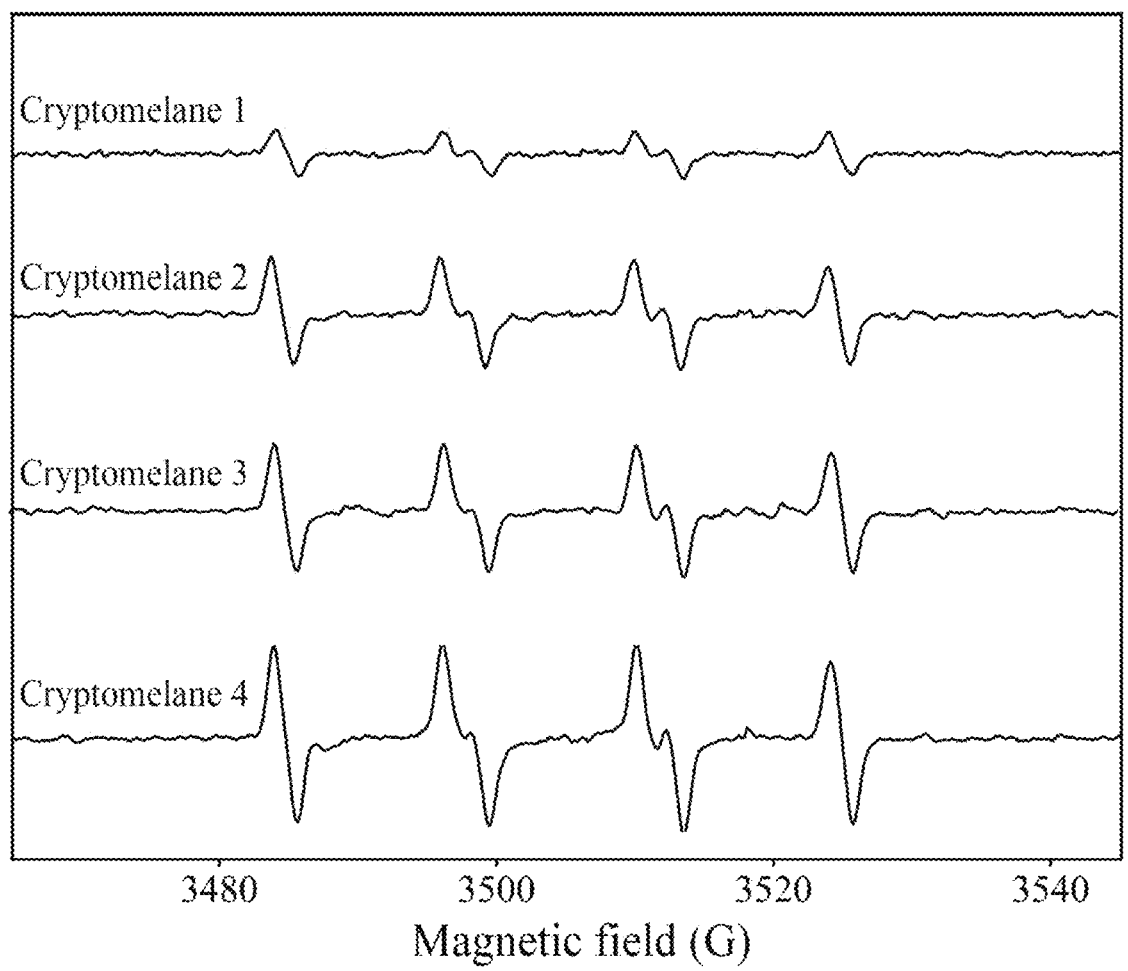
FIG. 6 is a diagram of the generation of free radicals of cryptomelane synthesized according to the present disclosure.

Catalytic action of active free radicals in the cryptomelane is an important process for mediating the degradation of pollutants. The generation ability of active free radicals of the cryptomelane is determined to evaluate their ability to oxidize and degrade pollutants. The electromagnetic paramagnetic resonance spectroscopy shows that the cryptomelane can generate superoxide radicals, as shown in FIG. 6. The concentration order of superoxide radicals is: cryptomelane 4>cryptomelane 3>cryptomelane 2>cryptomelane 1. Therefore, the cryptomelane 4 has smaller particle structure, and can generate more superoxide radicals.

Exploration 2: Exploration of degradation effect of cryptomelane in the scheme described in Embodiment 14 on different HPAHs in soil According to the method in Embodiment 14, a mixture of cryptomelane 4, accounting for 2.5% of the mass of the soil sample, is prepared, and polluted by 9-chlorofluorene, 9-bromofluorene, 9-chlorophenanthrene, 9-bromophenanthrene, 1-chloropyrene and 1-bromopyrene, respectively. Degradation experiments are carried out at the room temperature, and soil samples are taken on $7^{th}$ and $14^{th}$ days of the experiment. For example, a determination method of a residual rate of 1-chloropyrene is as follows: determining the concentration of 1-chloropyrene by a high-performance liquid chromatograph, and then calculating the residual rate of 1-chloropyrene in the soil. Chromatographic conditions are as follows: an LC-20AT high-performance liquid chromatograph is used, the injection volume is 20 μL, a mobile phase is methanol/water (v:v=9:1), the flow rate is 1.0 mL min$^{-1}$, a chromatographic column is a reversed-phase C18 column with 250 mm×4.6 mm, a column temperature is 40° C., and a detection wavelength is 254 nm. In the above experiments, 3 parallel experiments are set in each group, and an average value is taken as the residual rate of 1-chloropyrene in the soil.

Figure 8:
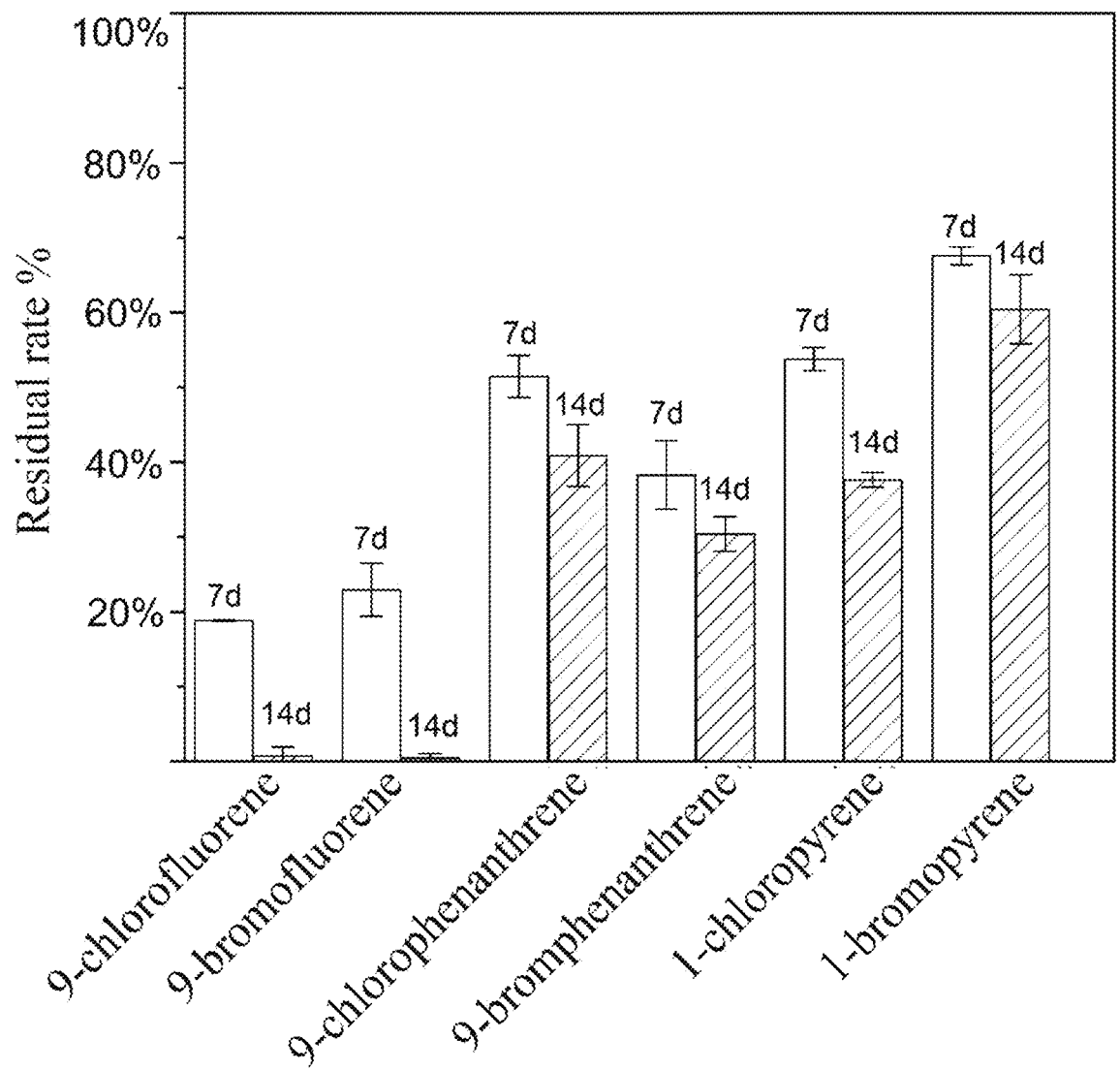
FIG. 8 is a diagram showing degradation effects of cryptomelane according to the present disclosure on different HPAHs in soil.

FIG. 8 is a diagram showing a degradation effect of cryptomelane according to the present disclosure on different HPAHs in the soil. The residual rates of 9-chlorofluorene, 9-bromofluorene, 9-chlorophenanthrene, 9-bromophenanthrene, 1-chloropyrene and 1-bromopyrene in the soil are determined according to the above methods, respectively; and determination results are 0%, 0%, 40.9%, 30.4%, 37.6% and 60.4%, respectively. 9-chlorofluorene and 9-bromofluorene have been completely degraded, and the other four types of HPAHs have also been obviously degraded. The cryptomelane used in the present disclosure has a good degradation effect on both ClPAHs and BrPAHs, and has a degradation effect on HPAHs with different parent materials of fluorene, phenanthrene and pyrene. Therefore, the cryptomelane provided by the present disclosure has excellent catalytic efficiency for the degradation of HPAHs in the soil, has broad spectrum, and is suitable for the degradation of different HPAHS. In the following explorations, the degradation effect of 1-chloropyrene is as an example for illustration.

Exploration 3: Exploration of degradation effects of different application amounts of cryptomelane in the schemes of Embodiment 14, Embodiment 1 and Embodiment 15 on 1-chloropyrene in soil.

According to methods in Embodiment 14, Embodiment 1 and Embodiment 15, soil samples with cryptomelane 4 contents of 2.5%, 7.5% and 5% are correspondingly prepared, a soil sample without cryptomelane 4 (i.e., the cryptomelane 4 content is 0%) is used as a control group, and then these soil samples are polluted by 1-chloropyrene, respectively. A degradation experiment is carried out at the room temperature. Soil samples are taken on $7^{th}$ and $14^{th}$ days of the experiment, and the residual rate of 1-chloropyrene in the soil is determined according to the method in Exploration 2.

Figure 9:
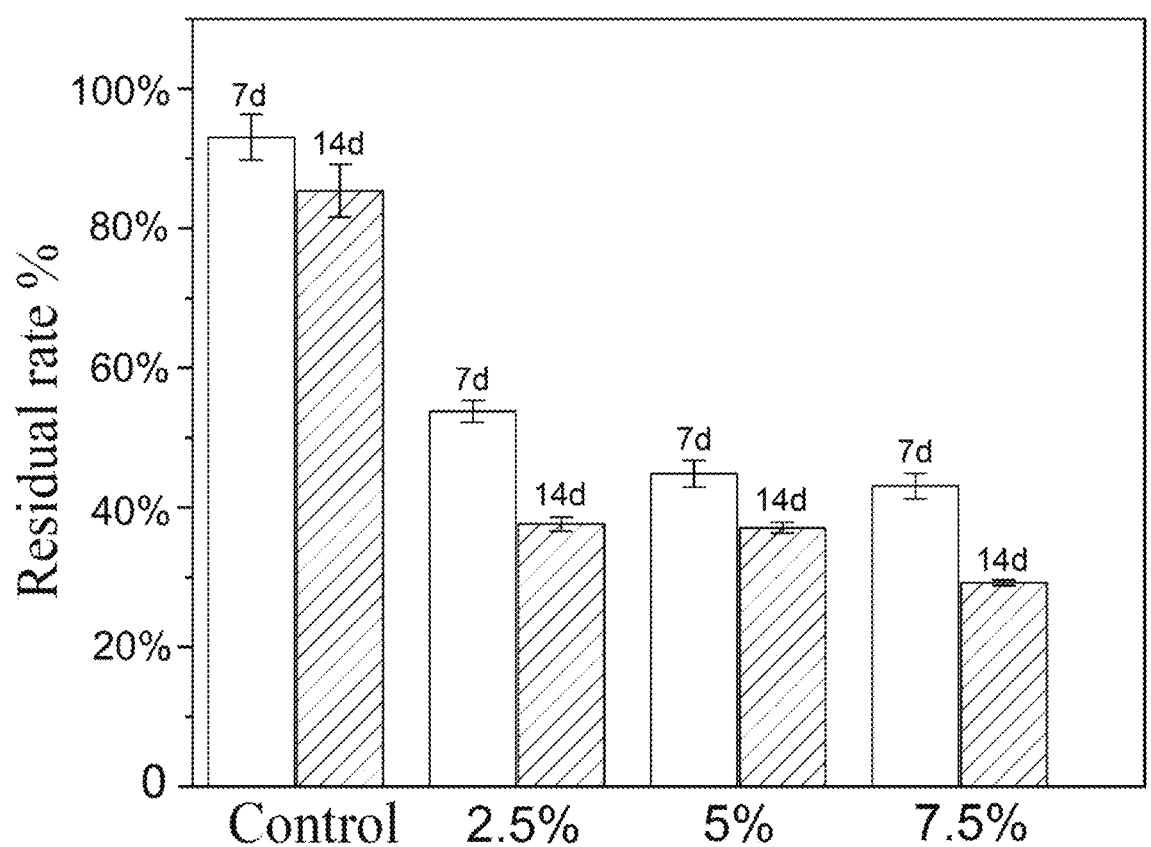
FIG. 9 is a diagram showing degradation effects of different application amounts of cryptomelane according to the present disclosure on 1-chloropyrene in soil.

FIG. 9 is a diagram showing degradation effects of different application amounts of cryptomelane according to the present disclosure on 1-chloropyrene in soil. On the $14^{th}$ day of the experiment, the residue rates of 1-chloropyrene in the soil with cryptomelane contents of 0%, 2.5%, 5% and 7.5% are 85.4%, 37.6%, 37.1% and 29.2%, respectively. With the increase of the cryptomelane content, the residual rate of 1-chloropyrene is reduced. However, the doubling of cryptomelane content does not lead to a significant decrease in the residual rate in proportion. In practical application, by considering the relationship between economic cost and degradation efficiency, Embodiment 14 is selected as the optimal scheme.

Exploration 4: Exploration of degradation effect of cryptomelane in the scheme described in Embodiment 1 on 1-chloropyrene in soil Experimental steps of the degradation of 1-chloropyrene in the soil is as follows: transferring the soil to a brown glass bottle, adding 20 mL of 1-chloropyrene methanol solution, oscillating for 1 h, then pouring the soil into a 6 cm glass culture dish, and placing the glass culture dish in a normal temperature environment for degradation experiment; taking 100 mg of soil samples on the $7^{th}$ and $14^{th}$ days of the experiment, respectively; adding 10 mL of methanol into the soil samples, oscillating for 30 min in a shaker at a rotating speed of 200 rpm, then centrifuging in a centrifuge at a rotating speed of 3000 rpm for 5 min, and collecting a supernatant; continuing to add 10 mL of methanol to the centrifuged soil sample, repeating the above operation, and combining the supernatants; filtering the supernatants through a hydrophobic polytetrafluoroethylene filter, and then storing the supernatants in a brown liquid-phase vial; determining the concentration of 1-chloropyrene according to the method of Exploration 2, and then calculating the residual rate of 1-chloropyrene in the soil.

Figure 7:
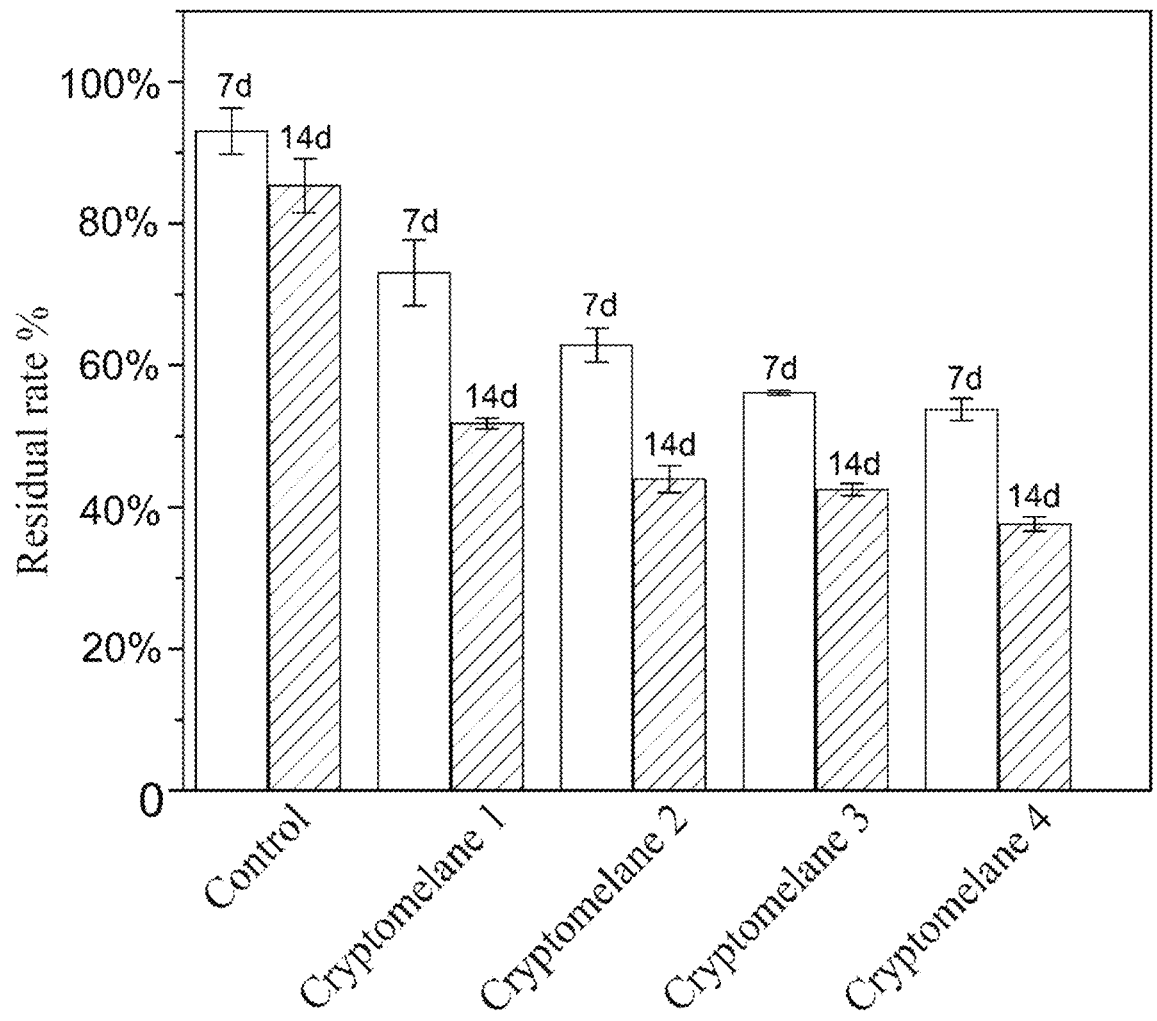
FIG. 7 is a diagram showing a degradation effect of different cryptomelane according to the present disclosure on 1-chloropyrene in soil.

FIG. 7 is a diagram showing degradation effects of different cryptomelane according to the present disclosure on 1-chloropyrene in soil. On the $14^{th}$ day, the residual rates of 1-chloropyrene in the soils with the cryptomelane 1, cryptomelane 2, cryptomelane 3 and cryptomelane 4 which account for 2.5% of the mass of the soil samples are 51.8%, 43.9%, 42.4% and 37.6%, respectively, while the residual rate of 1-chloropyrene in the original soil is 85.4%. Therefore, four types of cryptomelane are all beneficial to the degradation of 1-chloropyrene in the soil, and the order of the degradation efficiency is as follows: cryptomelane 4>cryptomelane 3>cryptomelane 2>cryptomelane 1, which is consistent with the particle size and free radical yield of cryptomelane. Cryptomelane 4 has more nanorods and higher superoxide radicals, and thus shows good catalytic efficiency for the degradation of 1-chloropyrene.

Exploration 5: Exploration of degradation effects of cryptomelane in the scheme described in Embodiment 14 on 1-chloropyrene in soils with different pH values A soil sample is collected, and an original pH value of the soil (soil:water=1:2.5) is determined by a pH electrode, and the pH value of the soil is 7.44. 0.01 mol L$^{-1}$ NaOH solution is slowly dropped into a soil suspension, and stirred continuously until the pH value of the soil is 9.37. Another soil sample is taken, 0.01 mol L$^{-1}$ HCl solution is slowly dropped into the soil suspension, and continuously stirred until the pH value of the soil is 4.50. The soil suspension is placed in a blast oven at 60° C., dried for 12 h, and then ground, and sieved with a 60-mesh sieve. Finally, the pH values of soil samples used are 4.50, 7.44 and 9.37, which represent acid soil, neutral soil and alkaline soil in the actual environment, respectively. The above soil samples are polluted by 1-chloropyrene, and then subjected to degradation experiments at the room temperature. Samples are taken regularly to determine the residual rates of 1-chloropyrene.

Figure 10:
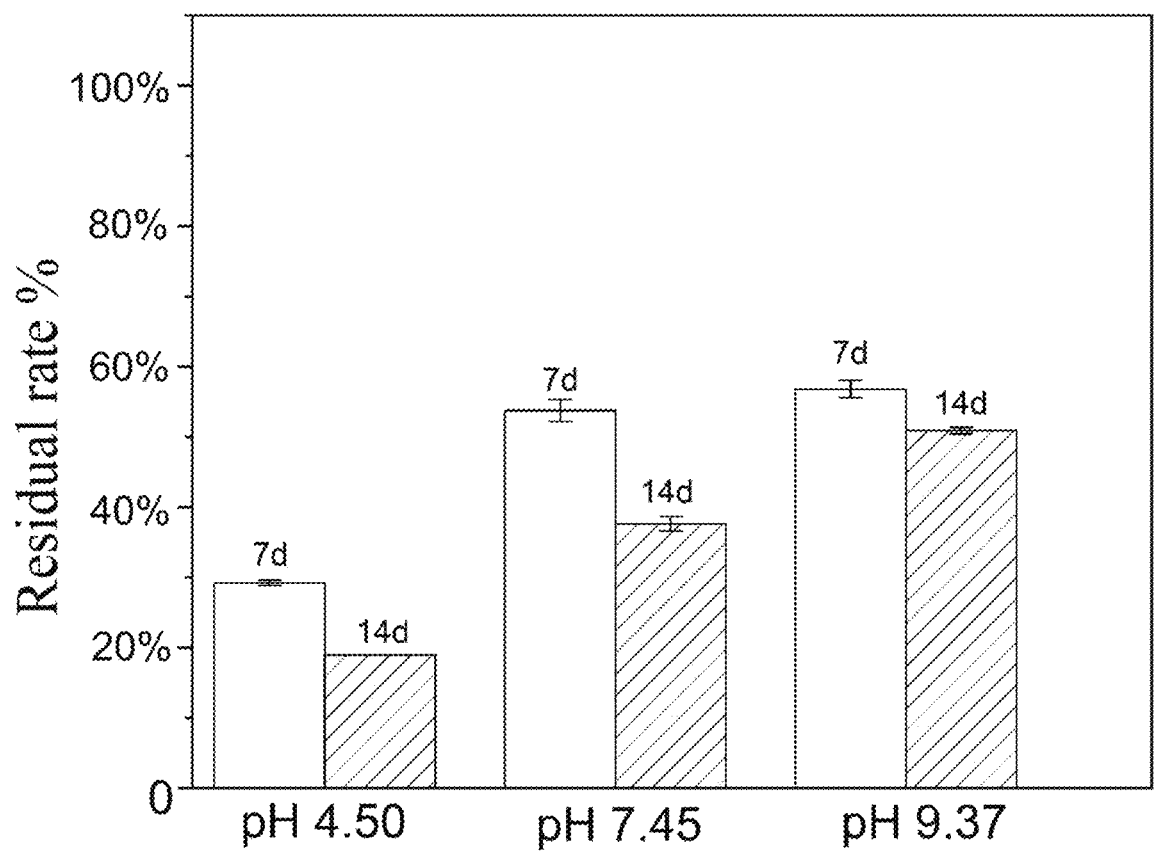
FIG. 10 is a diagram showing degradation effects of cryptomelane according to the present disclosure on 1-chloropyrene in soils with different pH values.

FIG. 10 is a diagram showing a degradation effect of cryptomelane according to the present disclosure on 1-chloropyrene in soils with different pH values. On the $14^{th}$ day of the experiment, the residue rates of 1-chloropyrene in the soils with pH values of 4.50, 7.44 and 9.37 are 19.0%, 37.6%, and 50.9%, respectively.

In the soils with different pH values, the cryptomelane has effect on 1-chloropyrene in the soil, but 1-chloropyrene in acidic soil is more easily degraded by the cryptomelane.

Exploration 6: Exploration of the influence of preparation parameters and preparation steps of cryptomelane on the degradation effect of 1-chloropyrene The cryptomelane prepared in Embodiment 1, Embodiment 4-Embodiment 5 and Embodiment 8-Embodiment 17 is used to treat the soil polluted by 1-chloropyrene, respectively, and the method in Exploration 2 is used to determine the residual rate of 1-chloropyrene in the soil with initial pH value of 4.5 on the $14^{th}$ day. The results are shown in Table 2.

Comparative example 1: the difference from Embodiment 1 is that in Step S1, in the composite treatment method, the active components do not include sodium silicate.

Comparative example 2: the difference from Embodiment 1 is that after the droplets A are introduced, the surface of solid cryptomelane is perforated by laser, and then the droplets B are sprayed into the solid cryptomelane.

Comparative example 3: the difference from Embodiment 12 is that the ultrapure water is added according to a situation that a volume ratio of the supernatant that is poured out to the ultrapure water of 1:1.2.

Comparative example 4: the difference from Embodiment 1 is that no composite treatment is carried out.

By comparing the data of Embodiment 1, Embodiment 12 to Embodiment 13 and Comparative Example 2, it can be obtained that the laser perforation adopted in Comparative example 2 may also cause the weakening of the degradation efficiency of the cryptomelane on 1-chloropyrene in comparison with a direct freeze-drying pore-forming mode, this is because the laser perforation is easy to affect the surface structure of the cryptomelane. However, in the freeze-drying pore-forming process, the surface structure of the cryptomelane is relatively stable, and the pH regulator is filled in large and irregular pores, thus optimizing local pH environment of the soil, increasing the reaction interface, improving the mass transfer process, and slowing down pH fluctuation.

By comparing the data of Embodiment 1, Embodiment 4 to Embodiment 5 and Comparative Example 3, it can be obtained that the degradation of the cryptomelane on 1-chloropyrene is weakened if the amount of the added ultrapure water in Comparative Example 3 is higher than the loss of supernatant, this is because the addition of ultrapure water with the same volume as the supernatant in Embodiment 1, Embodiment 4 to Embodiment 5 can reduce the concentration gradient between the product and the solvent, which is conducive to dispersing the product more evenly and reducing an agglomeration phenomenon, thus obtaining a more uniform product distribution. However, in the cryptomelane prepared by the method of Comparative Example 3, the

TABLE 2

Degradation effects cryptomelane prepared in Embodiment 1, Embodiment 4 to Embodiment 5, Embodiment 8 to Embodiment 17 and Comparative Example 1 to Comparative Example 4 on 1-chloropyrene

| Groups | Embodiment 1 | Embodiment 4 | Embodiment 5 | Embodiment 8 | Embodiment 9 | Embodiment 10 | Embodiment 11 | Embodiment 12 |
|---|---|---|---|---|---|---|---|---|
| Residual rate of 1-chloropyrene | 19.0% | 20.3% | 20.1% | 19.5% | 19.2% | 19.5% | 19.9% | 18.7% |

| Groups | Embodiment 13 | Embodiment 14 | Embodiment 15 | Embodiment 16 | Embodiment 17 | Comparative example 1 | Comparative example 2 | Comparative example 3 |
|---|---|---|---|---|---|---|---|---|
| Residual rate of 1-chloropyrene | 19.0% | 18.9% | 18.9% | 19.0% | 18.9% | 25.7% | 24.3% | 25.9% |

| Groups | Comparative example 4 |
|---|---|
| Residual rate of 1-chloropyrene | 27.9% |

Conclusion: According to the data in Table 2, by comparing the data of Embodiment 1, Embodiment 10 to Embodiment 11 and Comparative Example 1, there is no sodium silicate in Comparative Example 1, the degradation efficiency of cryptomelane on 1-chloropyrene is significantly weakened, this is because silicate ions in the sodium silicate can react with metal ions on the surface of cryptomelane to form silicate compounds, thus forming hydrophobic films. The hydrophobic films can increase the adsorption capacity of cryptomelane on the halogenated polycyclic aromatic hydrocarbons, and further catalyze the cryptomelane on the halogenated polycyclic aromatic hydrocarbons. By comparing the data of other embodiments in Table 2, the preparation parameters of the cryptomelane have little influence on the degradation efficiency of halogenated polycyclic aromatic hydrocarbons in the soil.

product is excessively diluted due to excessive ultrapure water, resulting in the degradation rate of only 25.9% on the $14^{th}$ day.

Compared with the data of Comparative Example 4, Embodiment 1, Embodiment to Embodiment 13 show that the pH value of the soil decreases greatly after the treatment of cryptomelane, and the decrease will have an impact on the biological activity and microbial diversity of the soil. In the process of composite treatment, the adsorption capacity of the cryptomelane to the halogenated polycyclic aromatic hydrocarbons can be increased by transforming active components into hydrophobic films, such that the halogenated polycyclic aromatic hydrocarbons can be more easily adsorbed on the hydrophobic surfaces. Moreover, under the action of the hydrophobic film, the droplets B are easier to enter and stay in the pores, thus realizing the filling function of the pH regulator in the pores, and effectively avoiding the influence of pH change on the soil environment. By adopting the method, the pH of the soil environment can be always maintained at a proper condition, the oxidation effect of potassium permanganate is further optimized, and the damage to organic carbon is reduced. The protective solution under the above parameters can be attached to the surface of the solid cryptomelane, thereby improving the degradation ability of the solid cryptomelane on the halogenated polycyclic aromatic hydrocarbons.

In conclusion, compared with the prior art, the cryptomelane provided by the present disclosure has better degradation effect on halogenated polycyclic aromatic hydrocarbons in the soil, which can reduce the damage to organic carbon in the degradation process, and has less influence on the performance of the soil.

The invention claimed is:

1. A method for degrading halogenated polycyclic aromatic hydrocarbons in soil by using cryptomelane, comprising the following steps:
   S1: preparing cryptomelane
   S1-1: dissolving 0.01 mol of $MnCl_2$ and 0.015-0.02 mol of $KMnO_4$ in 95-105 mL of water, stirring at a rate of 140-160 rpm until the $MnCl_2$ and $KMnO_4$ are completely dissolved, after the $MnCl_2$ and $KMnO_4$ are completely dissolved, transferring the water to a high-pressure reaction kettle, putting the high-pressure reaction kettle in a blast oven to react at 155-165° C. for 22-26 hours, thus obtaining a reaction product;
   S1-2: centrifuging the reaction product at 7500-8500 rpm for 8-12 min, and adding ultrapure water after pouring out a supernatant;
   S1-3: repeating an operation of Step S1-2 for 8-10 times, and drying a bottom solid to obtain a dried solid;
   S1-4: adding the dried solid into a $Cu(NO_3)_2$ aqueous solution with a concentration of 0.01-0.1 mol/L, oscillating in a shaker at 180-220 rpm for 10-14 hours to obtain a suspension;
   S1-5: centrifuging the suspension at a rotating speed of 7500-8500 rpm for 8-12 min, and adding ultrapure water after pouring out a supernatant;
   S1-6: repeating an operation of Step S1-5 for 8-10 times, and drying and grinding to obtain solid cryptomelane;
   S2: degrading halogenated polycyclic aromatic hydrocarbons in soil
   S2-1: taking a soil sample, and grinding and removing impurities;
   S2-2: adding the solid cryptomelane prepared in Step S1, which accounts for 2.5-7.5% of the mass of the soil sample, into the soil sample, uniformly mixing to obtain a mixture, and then transferring the mixture to the shaker with a rotating speed of 190-210 rpm to oscillate for 1-2 hours, thus preparing a soil sample containing cryptomelane; and
   S2-3: finally transferring the soil sample containing cryptomelane into a brown glass bottle, adding a halogenated polycyclic aromatic hydrocarbon methanol solution according to situation that a ratio of the soil sample containing cryptomelane to the halogenated polycyclic aromatic hydrocarbon methanol solution is 9-11 mg/ml, oscillating at a rotating speed of 190-210 rpm for 1-1.5 hours, then pouring the soil sample containing cryptomelane into a glass culture dish, and degrading halogenated polycyclic aromatic hydrocarbons at a room temperature.

2. The method for degrading halogenated polycyclic aromatic hydrocarbons in soil by using cryptomelane according to claim 1, wherein in Step S1-3 and Step S1-6, a drying method comprises the following steps: drying the bottom solid in a blast oven at 65-75° C. for 11-13 hours, washing with absolute ethyl alcohol for 1-2 times, and continuing to dry at a vacuum condition of $0.9 \times 10^{-2}$-$1.1 \times 10^{-2}$ mmHg for 2-3 hours.

3. The method for degrading halogenated polycyclic aromatic hydrocarbons in soil by using cryptomelane according to claim 1, wherein in Step S1-2 and Step S1-5, the volume of the added ultrapure water is the same as that of the supernatant liquid that is poured out.

4. The method for degrading halogenated polycyclic aromatic hydrocarbons in soil by using cryptomelane according to claim 1, wherein in Step S1-6, a grinding treatment method comprises the following steps: firstly, putting the dried solid cryptomelane into an agate mortar for grinding and crushing, then sieving with a 50-70 mesh sieve, removing impurities, and continuously grinding and sieving with a 90-110 mesh sieve.

5. The method for degrading halogenated polycyclic aromatic hydrocarbons in soil by using cryptomelane according to claim 1, wherein in Step S2-1, a grinding and impurity-removal treatment method comprises the following steps: firstly, carrying out physical impurity removal on the soil sample, then carrying out coarse grinding to obtain a soil sample with a particle size of 30-40 meshes, then carrying out secondary impurity removal, continuously and finely grinding the soil sample with a particle size of 30-40 meshes, and finally obtaining a soil sample with a particle size of 55-65 meshes.

6. The method for degrading halogenated polycyclic aromatic hydrocarbons in soil by using cryptomelane according to claim 1, wherein after step S1, the solid cryptomelane is subjected to composite treatment, and the composite treatment method comprises the following steps:
   (1) atomizing, by ultrasonic spraying, active components to generate droplets A, and atomizing a regulatory component to generate droplets B;
   wherein the active components, in terms of mass percentage, comprise 40-60% of plant ash, 15-25% of vitamin $B_{12}$, 5-7% of sodium silicate and the balance of water, and the regulatory component is a pH regulator; and
   (2) under the drive of a nitrogen gas flow of 500-700 SCCM, spraying the droplets A on the surface of the solid cryptomelane through a bubble refiner, stopping ultrasonic spraying after introducing 0.1-2.0 L of atomized droplets A into every 30-50 g of solid cryptomelane, and freeze-drying at −60° C. to −40° C. for 20-30 min to generate pores; under the drive of the nitrogen gas flow of 200-300 SCCM, spraying the droplets B into the pores on the surface of the solid cryptomelane through the bubble refiner, and stopping ultrasonic spraying after introducing 0.1-2.0 L of atomized droplets B into every 80-100 g of solid cryptomelane, and drying in vacuum for 1.5-2 hours at a room temperature to obtain solid cryptomelane after composite treatment.

7. The method for degrading halogenated polycyclic aromatic hydrocarbons in soil by using cryptomelane according to claim 6, wherein in Step (1), the pH regulator is composed of lime water with a mass concentration of 2-3% and calcined gypsum in equal volume ratio.

8. The method for degrading halogenated polycyclic aromatic hydrocarbons in soil by using cryptomelane according to claim 6, wherein porosity of the solid cryptomelane is 30-50%.

9. The method for degrading halogenated polycyclic aromatic hydrocarbons in soil by using cryptomelane according to claim 1, wherein the halogenated polycyclic aromatic hydrocarbons are 9-chlorofluorene, 9-bromfluorene, 9-chlorophenanthrene, 9-bromphenanthrene, 1-chloropyrene, and 1-brompyrene.

\* \* \* \* \*